United States Patent
Eifert

(10) Patent No.: US 10,323,577 B2
(45) Date of Patent: Jun. 18, 2019

(54) SELF-COOLED GAS BOTTLE

(71) Applicant: Rolls-Royce North American Technologies, Inc., Indianapolis, IN (US)

(72) Inventor: Andrew J. Eifert, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 631 days.

(21) Appl. No.: 15/050,451

(22) Filed: Feb. 22, 2016

(65) Prior Publication Data
US 2016/0245173 A1    Aug. 25, 2016

Related U.S. Application Data

(60) Provisional application No. 62/119,450, filed on Feb. 23, 2015.

(51) Int. Cl.
*F02C 7/32*    (2006.01)
*F02C 7/12*    (2006.01)

(52) U.S. Cl.
CPC ............... *F02C 7/32* (2013.01); *F02C 7/12* (2013.01); *Y02T 50/671* (2013.01)

(58) Field of Classification Search
None
See application file for complete search history.

(56) References Cited

U.S. PATENT DOCUMENTS

| | | | | |
|---|---|---|---|---|
| 2,822,693 | A * | 2/1958 | Mulsow | F16K 31/002 137/62 |
| 2,970,452 | A * | 2/1961 | Beckman | F17C 9/02 222/386.5 |
| 3,596,467 | A * | 8/1971 | Avery | F02C 9/30 476/4 |
| 4,043,120 | A | 8/1977 | Hoffeins | |
| 4,777,793 | A | 10/1988 | Weigand et al. | |
| 4,819,423 | A | 4/1989 | Vershure, Jr. et al. | |
| 5,097,659 | A * | 3/1992 | Lampe | F02C 7/277 60/39.27 |
| 5,274,992 | A * | 1/1994 | Klaass | B64D 41/00 60/804 |
| 5,307,633 | A | 5/1994 | Koerner et al. | |
| 6,584,780 | B2 * | 7/2003 | Hibino | F17C 11/00 62/46.1 |
| 8,453,461 | B2 | 6/2013 | Draper | |
| 8,590,288 | B2 | 11/2013 | Ishiba | |

(Continued)

*Primary Examiner* — Todd E Manahan
*Assistant Examiner* — Todd N Jordan
(74) *Attorney, Agent, or Firm* — Fishman Stewart PLLC

(57) ABSTRACT

A gas bottle assembly may be provided for a gas turbine engine system. The gas bottle system may include a gas bottle, a regulator cavity, a conductor coil, and an insulating jacket. The gas bottle may be configured to store and selectively release pressurized fluid. The regulator cavity and conductor coil may be in fluid connection with the gas bottle. The conductor coil may be disposed around at least a portion of the gas bottle. The insulating jacket may disposed around at least a portion of the gas bottle, pressure regulator, and the conductor coil. The conductor coil may be configured to maintain or decrease a temperature of the gas bottle while the insulting jacket resists heat from other portions of the engine system.

20 Claims, 2 Drawing Sheets

(56) References Cited

U.S. PATENT DOCUMENTS

| | | | | |
|---|---|---|---|---|
| 2011/0127263 A1* | 6/2011 | Lee | ........................ | F17C 13/12 |
| | | | | 220/89.2 |
| 2011/0309076 A1* | 12/2011 | Liebenberg | ........... | F17C 13/025 |
| | | | | 220/203.01 |
| 2016/0195013 A1* | 7/2016 | Epstein | ................. | C10L 1/1608 |
| | | | | 60/39.463 |

* cited by examiner

SELF-COOLED GAS BOTTLE

CROSS-REFERENCE TO RELATED APPLICATIONS

This application claims priority to U.S. Provisional Patent Application No. 62/119,450 filed on Feb. 23, 2015, the contents of which are hereby incorporated by reference in its entirety.

FIELD OF TECHNOLOGY

An apparatus, assembly, and method for an improved gas bottle are disclosed, and more particularly, for example, a gas bottle for a gas turbine engine system.

BACKGROUND

It has become increasingly desirable to improve power and cooling systems, especially for vehicles such as aircraft. Traditional systems such as a gas-based system may be selected considering the weight sensitivity and wide temperature ranges of experienced by aircraft. Although it may be desirable to reduce mass and bulk in aircraft applications, gas-based systems may include a relatively bulky and less efficient gas-based system in order to cover the range of conditions that may be experienced by the aircraft. Further, traditional gas-based systems must be maintained near room temperature to maintain structural integrity and function, thereby driving typical placement away from hot regions of the vehicle, e.g., the engine. Additionally, typical systems have no mechanisms for self-cooling. As a result, traditional systems lack thermal isolation and self-cooling thereby resulting in limited placement options.

It would therefore be helpful to provide an improved gas bottle system. The improved gas bottle system may be placed in or near any portion of the engine or vehicle, e.g., in or near hot sections. Further, the improved gas bottle system may be thermally insulated. The gas bottle system may additionally be self-cooled.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

A gas bottle assembly may be provided for a gas turbine engine system. The gas bottle system may include a gas bottle, a regulator cavity, a conductor coil, and an insulating jacket. The gas bottle may be configured to store and selectively release pressurized fluid. The regulator cavity and conductor coil may be in fluid connection with the gas bottle. The conductor coil may be disposed around at least a portion of the gas bottle. The insulating jacket may be disposed around at least a portion of the gas bottle, pressure regulator, and the conductor coil. The conductor coil may be configured to maintain or decrease a temperature of the gas bottle while the insulting jacket resists heat from other portions of the engine system.

Figure 1:
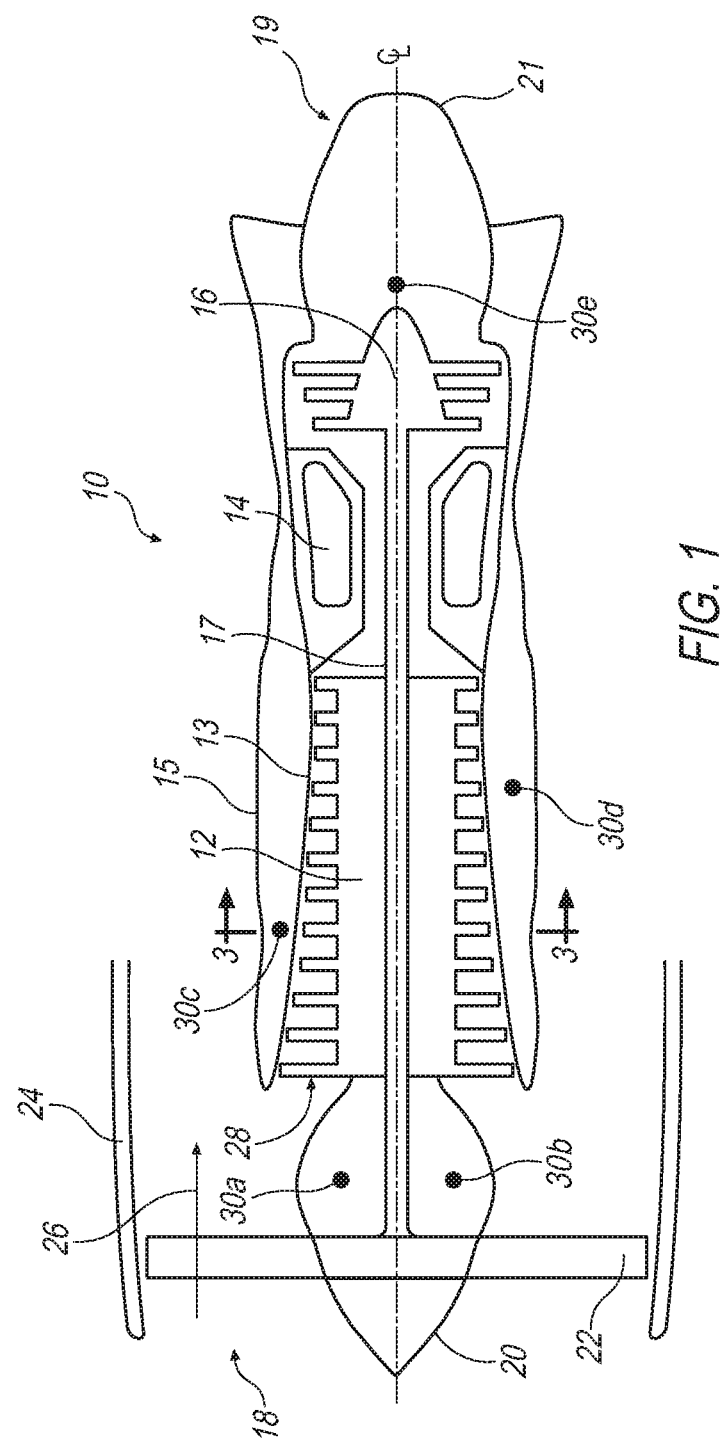
FIG. 1 is an illustration of a gas turbine engine system of the present disclosure, for example, having one or more gas bottle assemblies.

Turning now to the figures, FIG. 1 illustrates a gas turbine engine system 10. The engine system 10 may be configured as a primary mover or thrust source for a vehicle such as an aircraft. The engine system 10 may include a compressor 12, an inner shroud 13, a combustor 14, an outer shroud 15, a turbine 16, a shaft 17, a nose assembly 18, a tail assembly 19, and one or more gas bottle assembly 30. The nose assembly 18 may include a nosecone 20, blades 22 and a fan 24. The tail assembly 19 may include a tailcone 21. The blades 22 may direct low pressure air to a bypass flow path 26 and to the compressor intake 28, which in turn provides airflow to compressor 12. Exemplary aircraft may include helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial vehicles such as spacecraft.

With further reference to FIG. 1, one or more gas bottle assembly 30 may be capable of providing pressurized fluid to one or more locations of the aircraft and/or of the engine system 10. For example, one or more gas bottle assemblies 30a and 30b may be located in or around any portion of the nose assembly 18. One or more gas bottle assemblies 30c and 30d may be around or adjacent the compressor 12. One or more gas bottle assemblies 30e may be in or around any portion of the tail assembly 19. One or more gas bottles 32 may be in any other portion of the vehicle or engine system 10.

Figure 2:
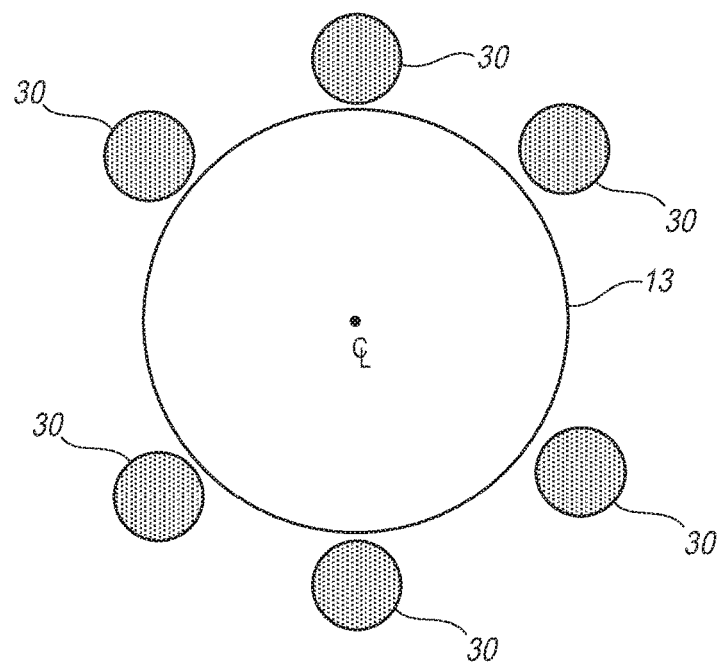
FIG. 2 is an illustration of a cross-section of a gas turbine engine system of the present disclosure, for example, having a plurality of gas bottle assemblies.

FIG. 2 illustrates a cross-section of an engine system 10, for example, having a plurality of gas bottle assemblies 30. One or a plurality of gas bottle assemblies 30 may be radially positioned about a centerline axis, e.g., in equal or any other increments. For example, one or a plurality of gas bottle assemblies 30 may be positioned about the inner shroud 13, e.g., adjacent the compressor 12. Alternatively or in addition, one or a plurality of gas bottle assemblies 30 may be positioned along a centerline axis. In a further example, the plurality of gas bottle assemblies 30 may be radially positioned about a centerline axis while being staggered along the centerline axis.

Figure 3:
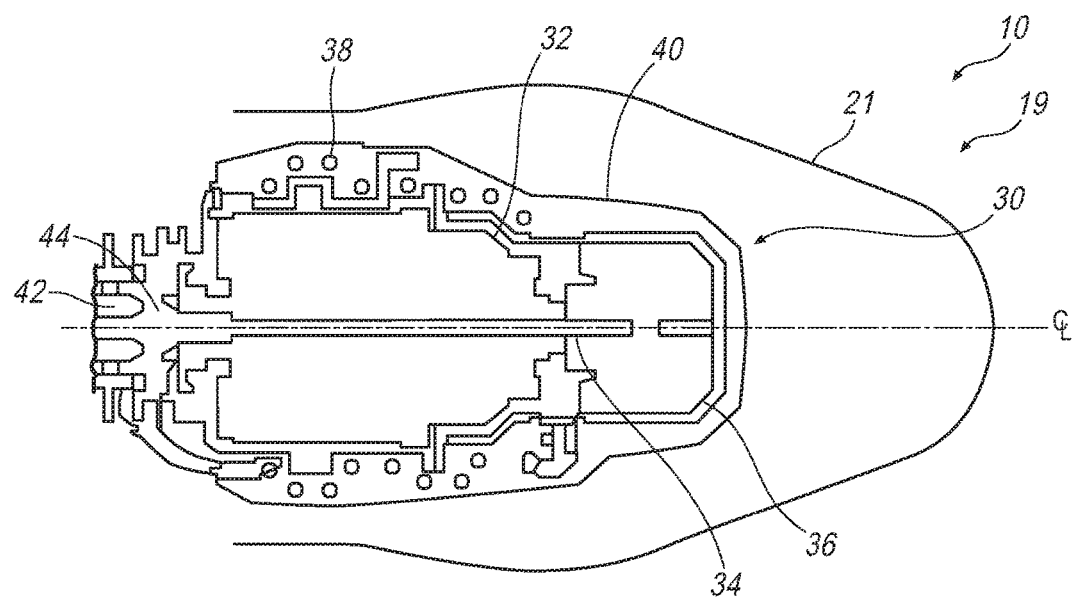
FIG. 3 is an illustration of a cross-section of a gas bottle assembly of the present disclosure.

FIG. 3 illustrates a schematic diagram of a gas bottle assembly 30. The gas bottle assembly 30 may include a gas bottle 32, a regulator valve 34, a regulator cavity 36, a coil 38, a jacket 40, an injector 42, and an injector valve 44. The gas bottle 32 may be configured to store and selectively release pressured gas to other portions of the engine system 10, e.g., the combustor 14. As used herein, the terms "gas" and "fluid" may be used interchangeably to describe any fluid substance, which may or may not have the elemental composition of air. An exemplary fluid may include any compressible fluid such as nitrogen.

The pressurized fluid from the gas bottle 32 may be used to provide pressurized fluid to the engine system 10. The gas bottle assembly 30 may be configured to provide a power boost to the engine system 10. The gas bottle 32 may be configured to be pressurized to a variety of pressures and may be of any size and/or shape and have a variety of constructions.

The gas bottle assembly 30 may also be configured for pressure regulation. The regulator valve 34 may be configured to selectively transfer fluid with respect to the gas bottle 32, e.g., to or from the regulator cavity 36. For example, the regulator valve 34 may transfer fluid in response to a first sensor (e.g., a pressure sensor) in or adjacent the gas bottle 32 reaching a predefined pressure, e.g., minimum, maximum, or desired pressure, and/or a second sensor (e.g., a temperature sensor) in or adjacent the gas bottle 32 reaching a predefined temperature, e.g., a minimum, maximum, or desired temperature. Alternatively, the regulator valve 34 may transfer gas continuously or periodically or in response to a user input from an operator the vehicle.

The gas bottle assembly 30 may be self-cooled. The coil 38 may be configured as a conductor coil. The gas bottle assembly 30 may be configured allow a flow of fluid from the gas bottle 32 to the coil 38, which may be disposed about the gas bottle 32. The coil 38 may receive fluid from the gas bottle 32, circulate fluid around the gas bottle 32, and then move fluid away from the gas bottle 32. Thus, the coil 38 may conduct heat from the gas bottle 32 to the circulating fluid, thereby self-cooling the gas bottle assembly 30. The gas bottle assembly 30 may be configured to provide a continuous flow of fluid to the coil 38. Alternatively, the gas bottle assembly 30 may be configured to provide a periodic flow of liquid to the coil 38, e.g., in response to a timer indicating a predefined time period or one or more temperature sensors positioned at portion of the engine system 10 and indicating a predefined temperature.

The gas bottle assembly 30 may be thermally insulated from other portions of the engine system 10. The jacket 40 may insulate the gas bottle 32 and the regulator cavity 36 from hot regions of the engine system 10. The jacket 40 may be disposed around all or any portion of the gas bottle 32 and regulator cavity 36. The jacket 40 may also be disposed against, e.g., on an interior or exterior side of the coil 38, or around the coil 38, e.g., encompassing the coil 38.

The gas bottle 32 may be charged with pressurized fluid while installed on the aircraft or prior to or during flight, e.g., using one or more engine systems 10. The gas bottle 32 may be configured to be releasably secured and selectively released from the vehicle or engine system 10, e.g., for servicing apart from the aircraft or engine system 10. The gas bottle 32 may be recharged by any other source either on or off the vehicle.

The injector 42 may be configured to provide pressurized fluid from the gas bottle assembly 30 to one or more engine systems 10, e.g., the combustor 14, to increase a power from that engine system 10. The injector valve 44 may selectively control the release of gas from the gas bottle assembly 30, e.g., in response to a user input from an operator of the vehicle.

The gas bottle assembly 30 may be configured to provide a power boost. The power boost may be utilized in response to one or more engine systems 10 being inoperative or suffering power production problems. For example, one or more engine systems 10 may experience a condition ranging anywhere from degraded performance to total engine failure such as might be experienced by mechanical or system failures, among other possibilities.

Alternatively or in addition, the gas bottle assembly 30 may be used to provide an increase in airflow in one of the engine systems or reduce a temperature of an airflow entering a portion of one of the engine system 10, such as an airflow entering the combustor 14 of the engine system 10. Consequently, when a temperature of a hot section of the engine system 10 is reduced below a predefined temperature and/or a temperature limit for a given fuel flow, the fuel flow can be increased to increase the power and increase the temperature toward a predefined temperature.

Methods of operating a gas bottle assembly with a gas turbine engine system are also contemplated. The method may include providing a gas bottle assembly including a gas bottle configured to store and selectively release pressurized fluid, a conductor coil disposed around at least a portion of the gas bottle, an insulating jacket disposed around at least a portion of the gas bottle, pressure regulator, and the conductor coil. The method may further include passing fluid from the gas bottle to the conductor coil, circulating fluid around the conductor coil, conducting heat from the gas bottle to the circulating fluid, and directing the fluid away from the gas bottle. The gas bottle assembly may include a regulator cavity in fluid connection with the gas bottle, wherein the regulator cavity selectively receives fluid from the gas bottle. The gas bottle assembly may include an injector in fluid connection with the gas bottle, wherein the injector selectively releases fluid from the gas bottle. The gas bottle may be fluidly connected to a combustor and selectively release fluid to the combustor in response to at least one of a sensor and a user input. A temperature of the gas bottle may decrease in response to the circulating fluid. In addition, the insulating jacket may resist heat from a hot region of the engine system.

With regard to the methods as described herein, it should be understood that, although steps may have been described as occurring according to a certain ordered sequence, such methods could be practiced with the described steps performed in an order other than the order described herein. Further, certain steps may be performed simultaneously, other steps may be added, or certain steps may be omitted. In other words, the descriptions of the methods herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A gas bottle assembly for a turbine engine, comprising:
    a gas bottle configured to store and selectively release pressurized fluid;
    a regulator cavity in fluid connection with the gas bottle;
    a conductor coil in fluid connection with the gas bottle and disposed around at least a portion of the gas bottle; and
    an insulating jacket disposed around at least a portion of the gas bottle, pressure regulator, and the conductor coil,
    wherein the regulator cavity is configured to selectively receive pressurized fluid from the gas bottle in response to a pressure sensor indicating a predefined pressure.

2. The assembly of claim 1, wherein the conductor coil receives pressurized fluid from the gas bottle and circulates fluid around the gas bottle.

3. The assembly of claim 1, further comprising an injector configured to selectively release pressurized fluid to a combustor using an injector valve.

4. The assembly of claim 1, wherein the gas bottle is configured to provide pressurized fluid to a combustor in response to a user input.

5. The assembly of claim 1, wherein the gas bottle is configured to provide pressurized fluid to a combustor in response to a temperature sensor indicating a predefined temperature.

6. The assembly of claim 1, the insulating jacket is configured to resist heat from a hot region of the turbine engine.

7. The assembly of claim 1, wherein the regulator cavity is configured to selectively receive pressurized fluid from the gas bottle in response to a temperature sensor indicating a predefined temperature.

8. A system of a gas turbine engine, the system comprising:
a combustor;
a gas bottle assembly fluidly connected to the combustor, the gas bottle assembly including:
a gas bottle configured to store and selectively release pressurized fluid;
a regulator cavity in fluid connection with the gas bottle;
a conductor coil in fluid connection with the gas bottle and disposed around at least a portion of the gas bottle; and
an insulating jacket disposed around at least a portion of the gas bottle, pressure regulator, and the conductor coil,
wherein the insulating jacket is configured to resist heat from a hot region of the gas turbine engine.

9. The system of claim 8, wherein the conductor coil receives pressurized fluid from the gas bottle and circulates fluid around the gas bottle.

10. The system of claim 8, further comprising an injector configured to selectively release pressurized fluid to the combustor using an injector valve.

11. The system of claim 8, wherein the gas bottle is configured to provide pressurized fluid to the combustor in response to a user input.

12. The system of claim 8, wherein the gas bottle is configured to provide pressurized fluid to the combustor in response to a temperature sensor indicating a predefined temperature.

13. The system of claim 8, wherein the regulator cavity is configured to selectively receive pressurized fluid from the gas bottle in response to a pressure sensor indicating a predefined pressure.

14. The system of claim 8, wherein the regulator cavity is configured to selectively receive pressurized fluid from the gas bottle in response to a temperature sensor indicating a predefined temperature.

15. A method of operating a gas bottle assembly for a gas turbine engine system, the method comprising:
providing a gas bottle assembly including a gas bottle configured to store and selectively release pressurized fluid, a conductor coil in fluid connection with the gas bottle and disposed around at least a portion of the gas bottle, an insulating jacket disposed around at least a portion of the gas bottle, pressure regulator, and the conductor coil;
at least one of:
wherein the insulating jacket is configured to resist heat from a hot region of the gas turbine engine system, and
providing a regulator cavity configured to selectively receive pressurized fluid from the gas bottle in response to a pressure sensor indicating a predefined pressure;
passing fluid from the gas bottle to the conductor coil;
circulating fluid around the conductor coil;
conducting heat from the gas bottle to the circulating fluid; and
directing the fluid away from the gas bottle.

16. The method of claim 15, the gas bottle assembly further including the regulator cavity in fluid connection with the gas bottle.

17. The method of claim 15, the gas bottle assembly further including an injector in fluid connection with the gas bottle, wherein the injector selectively releases fluid from the gas bottle.

18. The method of claim 15, wherein the gas bottle is fluidly connected to a combustor and selectively releases fluid to the combustor in response to at least one of a sensor and a user input.

19. The method of claim 15, wherein a temperature of the gas bottle decreases in response to the circulating fluid.

20. The method of claim 15, wherein the insulating jacket resists heat from the hot region of the gas turbine engine system.

* * * * *